(12) United States Patent
Chu et al.

(10) Patent No.: US 8,209,323 B2
(45) Date of Patent: Jun. 26, 2012

(54) METHODS AND APPARATUSES FOR DYNAMICALLY SEARCHING FOR ELECTRONIC MAIL MESSAGES

(75) Inventors: Wilson Chu, San Lorenzo, CA (US); Elena Vitorino, San Jose, CA (US); Jimmy Huang, San Jose, CA (US); Richard Iijima, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/185,367

(22) Filed: Jul. 18, 2011

(65) Prior Publication Data
US 2011/0270860 A1 Nov. 3, 2011

Related U.S. Application Data

(63) Continuation of application No. 11/458,326, filed on Jul. 18, 2006, now Pat. No. 8,001,114.

(51) Int. Cl.
*G06F 17/30* (2006.01)
(52) U.S. Cl. .......... 707/721; 707/754; 707/767
(58) Field of Classification Search .......... 707/721, 707/713, 759, 765, 761, 767, 754
See application file for complete search history.

(56) References Cited

U.S. PATENT DOCUMENTS

| | | | |
|---|---|---|---|
| 6,513,031 B1 * | 1/2003 | Fries et al. ............... | 1/1 |
| 6,564,213 B1 * | 5/2003 | Ortega et al. ............ | 1/1 |
| 6,751,606 B1 * | 6/2004 | Fries et al. ............... | 1/1 |
| 6,853,993 B2 * | 2/2005 | Ortega et al. ............ | 1/1 |
| 6,947,930 B2 | 9/2005 | Anick et al. | |
| 7,058,728 B1 | 6/2006 | Eklund | |
| 7,062,253 B2 | 6/2006 | Money et al. | |
| 7,409,383 B1 * | 8/2008 | Tong et al. ............... | 1/1 |
| 7,424,510 B2 | 9/2008 | Gross et al. | |
| 7,536,382 B2 * | 5/2009 | Zhou et al. ............... | 1/1 |
| 7,587,385 B2 * | 9/2009 | Vayssiere ............... | 1/1 |
| 7,647,312 B2 * | 1/2010 | Dai .................. | 707/999.004 |
| 7,657,423 B1 * | 2/2010 | Harik et al. ............ | 704/9 |
| 7,822,764 B2 | 10/2010 | Chu | |
| 7,831,609 B1 * | 11/2010 | Alexander ............ | 707/765 |
| 7,908,287 B1 * | 3/2011 | Katragadda ............ | 707/767 |
| 2002/0138479 A1 * | 9/2002 | Bates et al. ............ | 707/5 |

(Continued)

OTHER PUBLICATIONS

"Notification of Transmittal of the International Search Report or the Declaration," International Filing Date: Jul. 18, 2007, International Application No. PCT/US2007/073807, Applicant: Webex Communications, Inc., Date of Mailing: Jul. 28, 2008, pp. 1-9.

*Primary Examiner* — Sherief Badawi

(57) ABSTRACT

In one embodiment, an original search input entered is detected. A plurality of stored terms in a record are detected. The original search input is modified to remove an excluded term from the search input to form a modified search input. The modified search input is matched against the plurality of stored terms to form a first result that includes a number of the stored terms. The number of the stored terms in the first result is compared to a threshold value. In response to the number of the stored terms in the first result satisfying the threshold value, the stored terms of the first result are displayed. Otherwise, the original search input is matched against the plurality of stored terms to form a second result that includes a number of the stored terms, and the stored terms of the second result are displayed.

20 Claims, 7 Drawing Sheets

U.S. PATENT DOCUMENTS

| | | | |
|---|---|---|---|
| 2002/0194166 A1* | 12/2002 | Fowler | 707/3 |
| 2003/0130000 A1 | 7/2003 | Le et al. | |
| 2005/0222981 A1* | 10/2005 | Lawrence et al. | 707/3 |
| 2006/0248078 A1 | 11/2006 | Gross et al. | |
| 2007/0050339 A1* | 3/2007 | Kasperski et al. | 707/3 |
| 2007/0162481 A1* | 7/2007 | Millett | 707/101 |
| 2007/0276829 A1* | 11/2007 | Wang et al. | 707/7 |
| 2007/0282811 A1* | 12/2007 | Musgrove | 707/3 |
| 2008/0065617 A1* | 3/2008 | Burke et al. | 707/5 |
| 2008/0091675 A1* | 4/2008 | Chu et al. | 707/6 |
| 2008/0147637 A1* | 6/2008 | Li et al. | 707/5 |

* cited by examiner

400

METHODS AND APPARATUSES FOR DYNAMICALLY SEARCHING FOR ELECTRONIC MAIL MESSAGES

RELATED APPLICATIONS

This application for U.S. patent is a continuation of U.S. patent application Ser. No. 11/458,326 filed on Jul. 18, 2006 entitled "Methods and Apparatuses for Dynamically Searching for Electronic Mail Messages" by Wilson Chu et al., the contents of which are incorporated herein by reference in their entirety.

FIELD OF INVENTION

The present invention relates generally to searching for electronic mail within an electronic mail messages and, more particularly, to dynamically searching for electronic mail messages.

BACKGROUND

Electronic mail applications such as Outlook® and Tiger Mail® allow users to search for specific electronic mail messages by searching for a term or key word. The user can search for the term or key word in the body of the message, the subject line of the message, the sender, and/or the recipient. Further, the user can search for messages by date sent.

SUMMARY

In one embodiment, the methods and apparatuses detect an original search input; detect an excluded term within the original search input; form a modified search input wherein the modified search input includes the original search input without the excluded term; match a plurality of stored terms against the modified search input and forming a modified matched result; and selectively display the modified matched result based on a number of terms within the modified matched result.

BRIEF DESCRIPTION OF THE DRAWINGS

The accompanying drawings, which are incorporated in and constitute a part of this specification, illustrate and explain one embodiment of the methods and apparatuses for dynamically searching for electronic mail messages.

In the drawings.

DETAILED DESCRIPTION

The following detailed description of the methods and apparatuses for dynamically searching for electronic mail messages refers to the accompanying drawings. The detailed description is not intended to limit the methods and apparatuses for dynamically searching for electronic mail messages. Instead, the scope of the methods and apparatuses for dynamically searching for electronic mail messages is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

Figure 1:
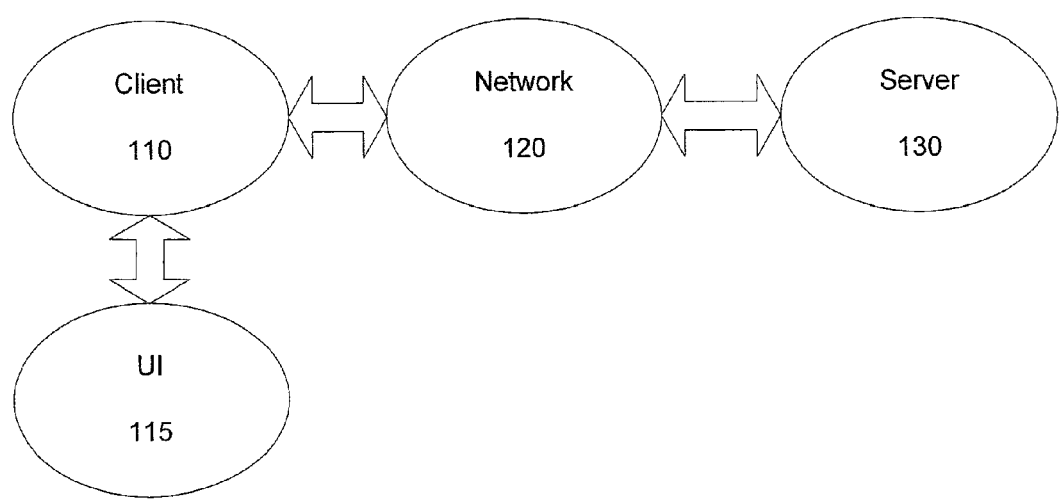
FIG. 1 is a diagram illustrating an environment within which the methods and apparatuses for dynamically searching for electronic mail messages are implemented.

FIG. 1 is a diagram illustrating an environment within which the methods and apparatuses for dynamically searching for electronic mail messages are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of dynamically enforcing privileges during a data collaboration session below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
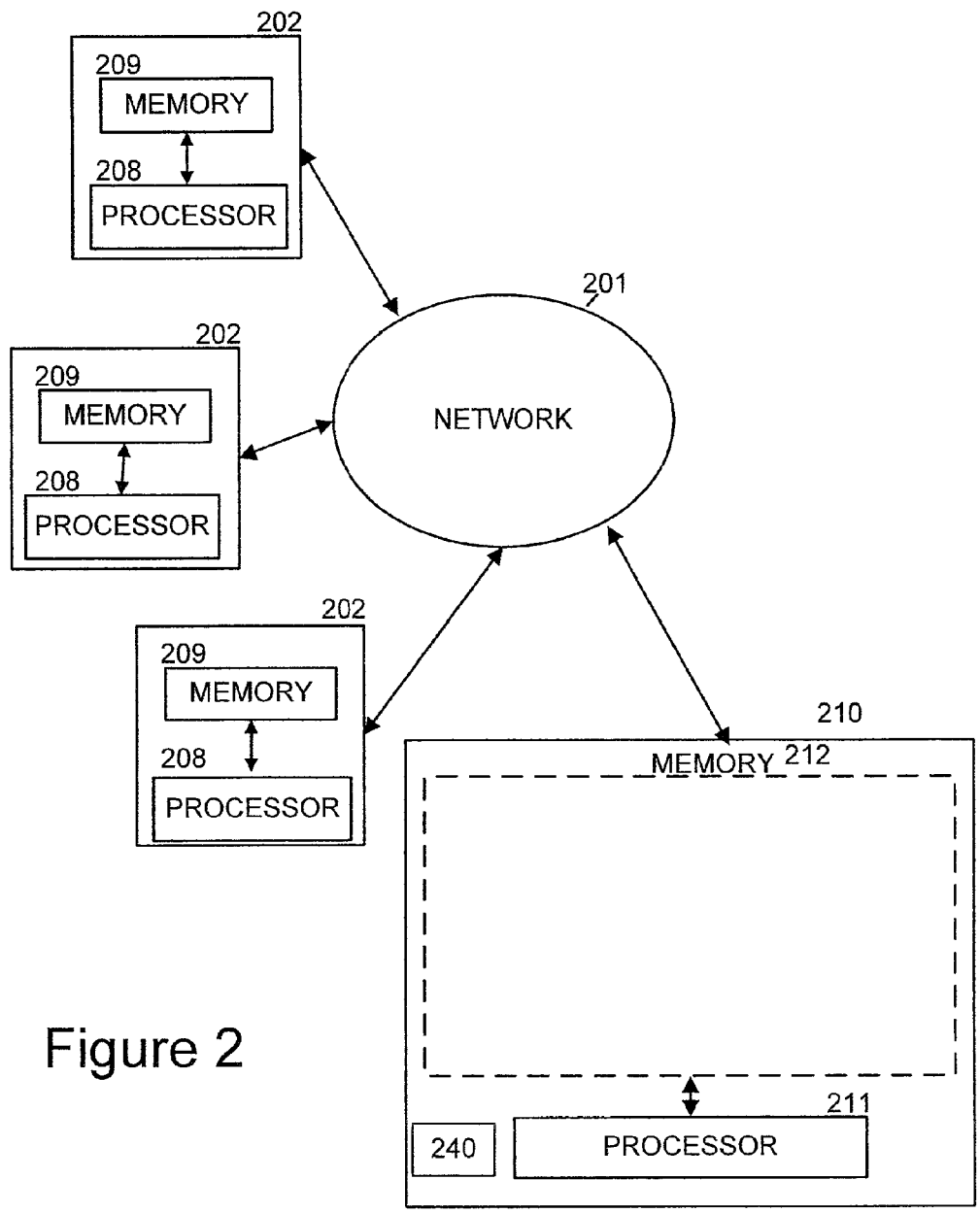
FIG. 2 is a simplified block diagram illustrating one embodiment in which the methods and apparatuses for dynamically searching for electronic mail messages are implemented.

FIG. 2 is a simplified diagram illustrating an exemplary architecture in which the methods and apparatuses for dynamically searching for electronic mail messages are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for dynamically searching for electronic mail messages. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on dynamically enforcing privileges during a data collaboration sessions determined using embodiments described below.

Figure 3:
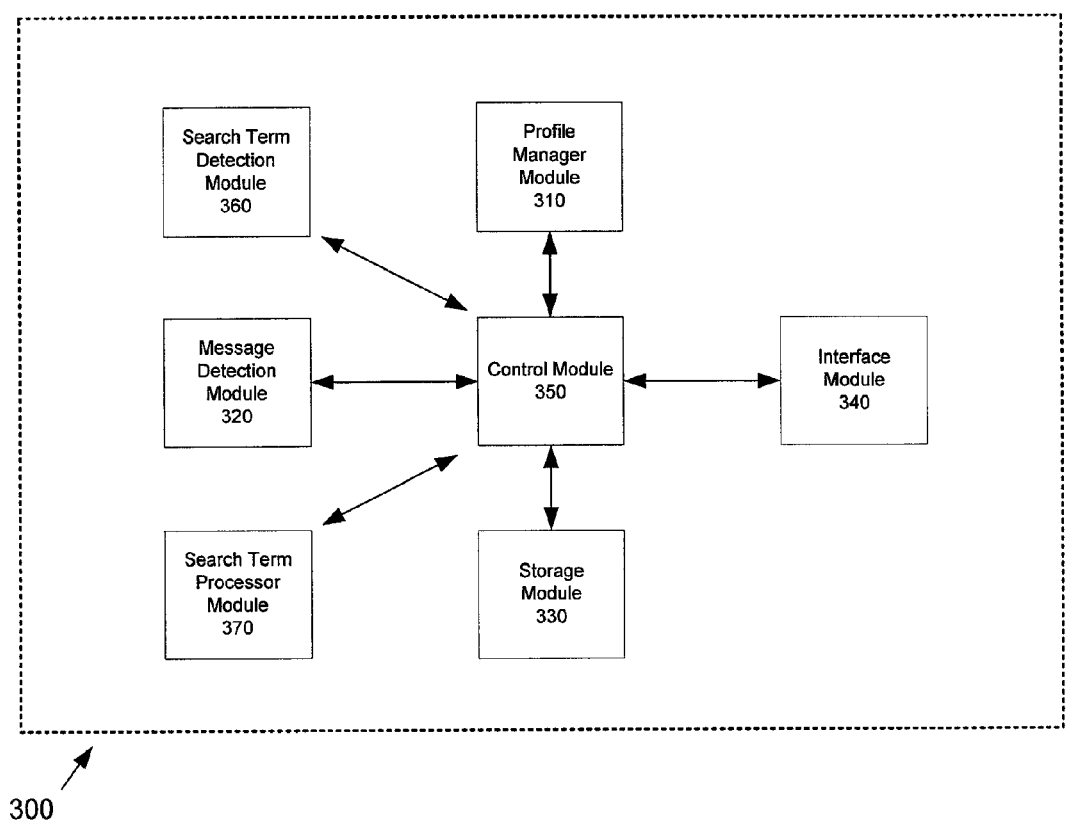
FIG. 3 is a simplified block diagram illustrating a system, consistent with one embodiment of the methods and apparatuses selectively controlling a remote device.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a profile manager module 310, a message detection module 320, a storage module 330, an interface module 340, a control module 350, a search term detection module 360, and search term processor module 370.

In one embodiment, the control module 350 communicates with the profile manager module 310, the message detection module 320, the storage module 330, the interface module 340, the control module 350, the search term detection module 360, and the search term processor module 370. In one embodiment, the control module 350 coordinates tasks, requests, and communications between the profile manager module 310, the message detection module 320, the storage module 330, the interface module 340, the control module 350, the search term detection module 360, and the search term processor module 370.

In one embodiment, the profile manager module 310 organizes and tracks the profiles. In one embodiment, each profile corresponds to a device. In another embodiment, each profile corresponds to a user of a device.

In another embodiment, each profile corresponds to an electronic mail account. In another embodiment, each profile corresponds to a group of electronic mail accounts.

In one embodiment, the message detection module 320 detects and identifies the electronic mail message. In one embodiment, the message detection module 320 detects the words within the electronic mail message. For example, a typical electronic mail message includes a sender field, a recipient field, a carbon copy field, a subject line, a date sent field, a date received field, and a body area. Further, the message detection module 320 indexes the detected words within the electronic mail message.

In one embodiment, the storage module 330 stores a record including a profile associated with the each device, user, electronic mail account, or group of electronic mail accounts. An exemplary profile is shown in a record 400 within FIG. 4.

In one embodiment, the storage module 330 stores electronic mail messages.

In one embodiment, the interface module 340 detects search terms from a device through the network 120. In one embodiment, the device is operated by a user. In one embodiment, the interface module 340 detects the search terms as the search term is entered. In one embodiment, the search term is detected as each character and/or symbol is entered. For example, if the search term is "restaurant", then each letter is detected prior to the complete term restaurant being received.

In one embodiment, the interface module 340 displays suggested search terms to the device either prior to or subsequent to receiving the entire search term from the device. In another embodiment, the interface module 340 provides the search results based on the search terms to the device.

In one embodiment, the search term detection module 360 is configured to detect the search term provided by the device. In one embodiment, the search term is detected as the search term is provided through the interface module 340. For example, as each character or letter that comprises the search term is entered, then the search term detection module 360 recognizes each letter as the search term is entered.

In one embodiment, the search term processor module 370 determines whether to modify the search terms based on the results of the search terms. Further based on the search terms provided by a device, the search term processor module 370 also determines suggestions for the search terms.

The system 300 in FIG. 3 is shown for exemplary purposes and is merely one embodiment of the methods and apparatuses for dynamically searching for electronic mail messages. Additional modules may be added to the system 300 without departing from the scope of the methods and apparatuses for dynamically searching for electronic mail messages. Similarly, modules may be combined or deleted without departing from the scope of the methods and apparatuses for dynamically searching for electronic mail messages.

Figure 4:
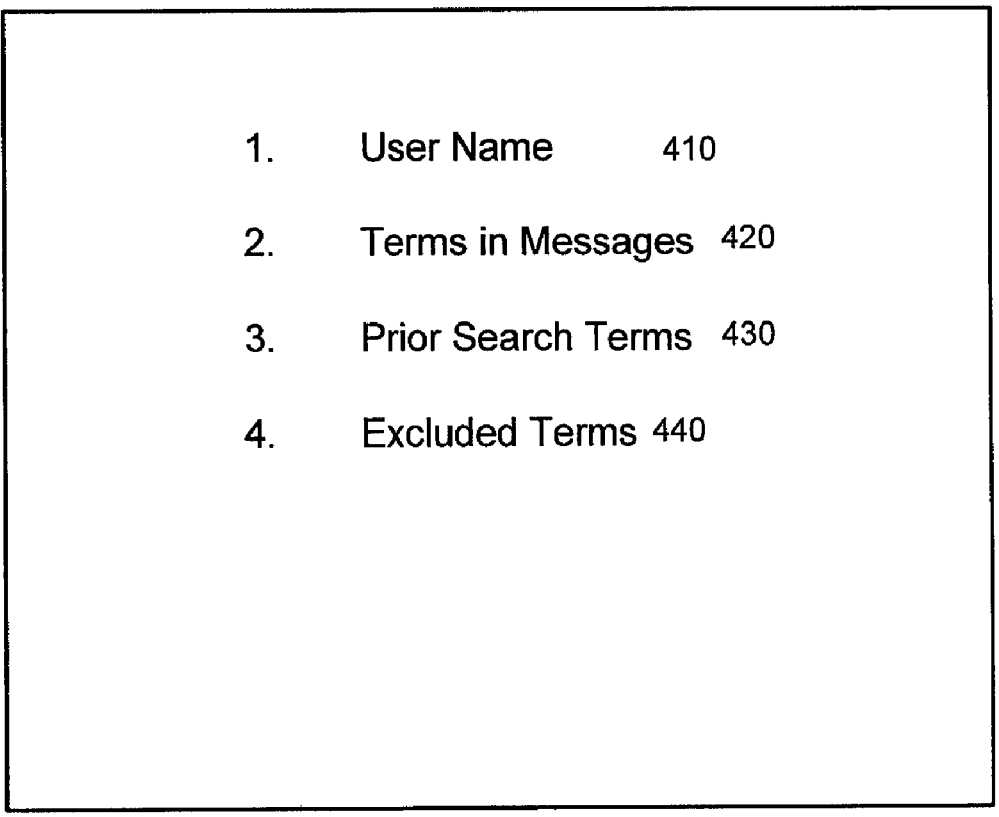
FIG. 4 is an exemplary record for use with the methods and apparatuses for dynamically searching for electronic mail messages.

FIG. 4 illustrates an exemplary record 400 for use with the methods and apparatuses for dynamically searching for electronic mail messages. In one embodiment, the record 400 illustrates an exemplary record associated with managing terms within messages, prior search terms, and excluded terms.

In one embodiment, there are multiple records such that each record 400 is associated with a particular user, device, or group of devices. Further, each device or user may correspond with multiple records wherein each record 400 is associated with a particular profile associated with the device.

In one embodiment, the record 400 includes a user name field 410, a terms messages field 420, a prior search terms field 430, and an excluded terms field 440. In one embodiment, the record 400 resides within the client 110. In another embodiment, the record 400 resides within the server 130.

In one embodiment, the user name field 410 includes information related to a user, a device, or group. For example, the group name field 410 may include a company name that includes the group of devices.

In one embodiment, the terms in messages field 420 includes terms that are detected within an electronic mail message associated with the individual or group identified within the user name field 410. The terms may include references to information within a sender field, a recipient field, a carbon copy field, a subject line, a date sent field, a date received field, and a body area. Further, the detected terms may also be indexed and stored within the terms in messages field 420.

In one embodiment, the excluded terms field 440 includes terms that are targeted to be excluded from a search term. For example, the excluded terms field 440 may include terms such as "the", "a", "best", and the like.

Figure 5:
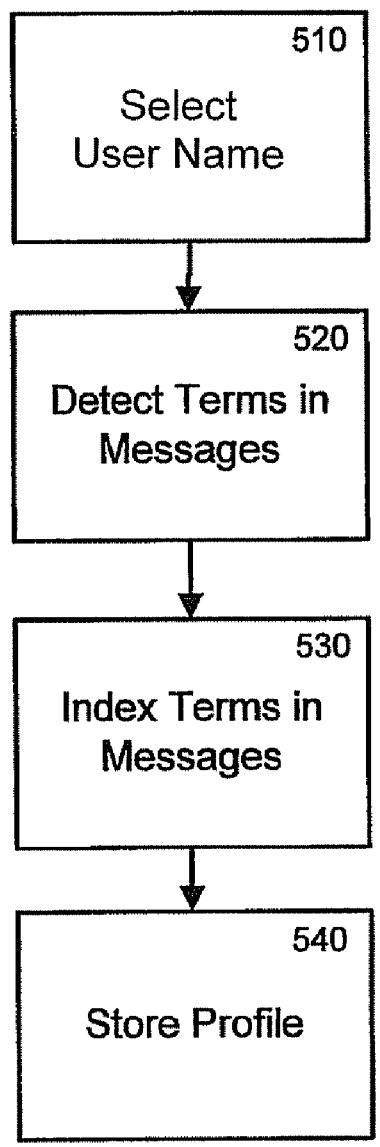
FIG. 5 is a flow diagram consistent with one embodiment of the methods and apparatuses for dynamically searching for electronic mail messages.
Figure 6:
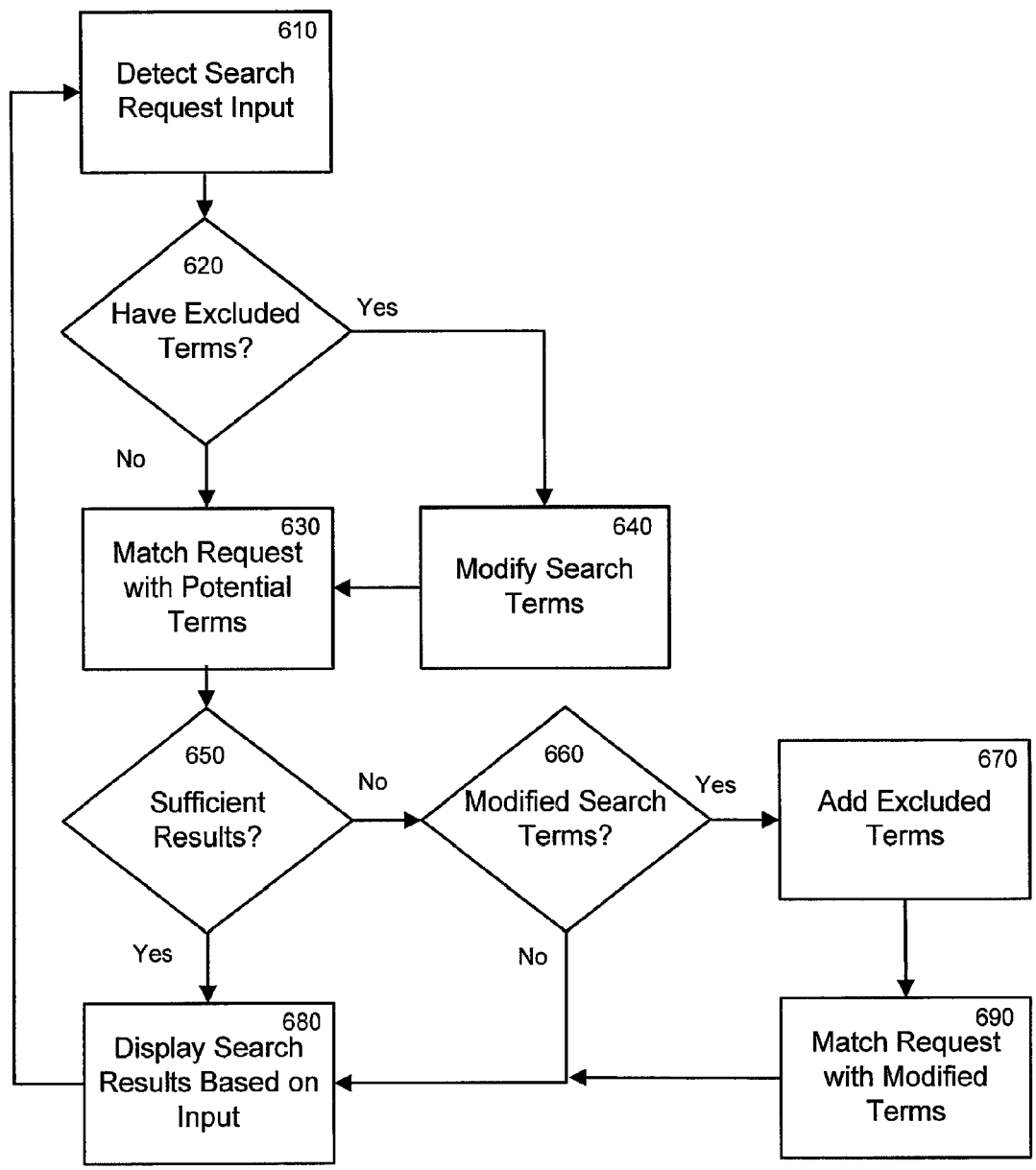
FIG. 6 is a flow diagram consistent with one embodiment of the methods and apparatuses for dynamically searching for electronic mail messages.
Figure 7:
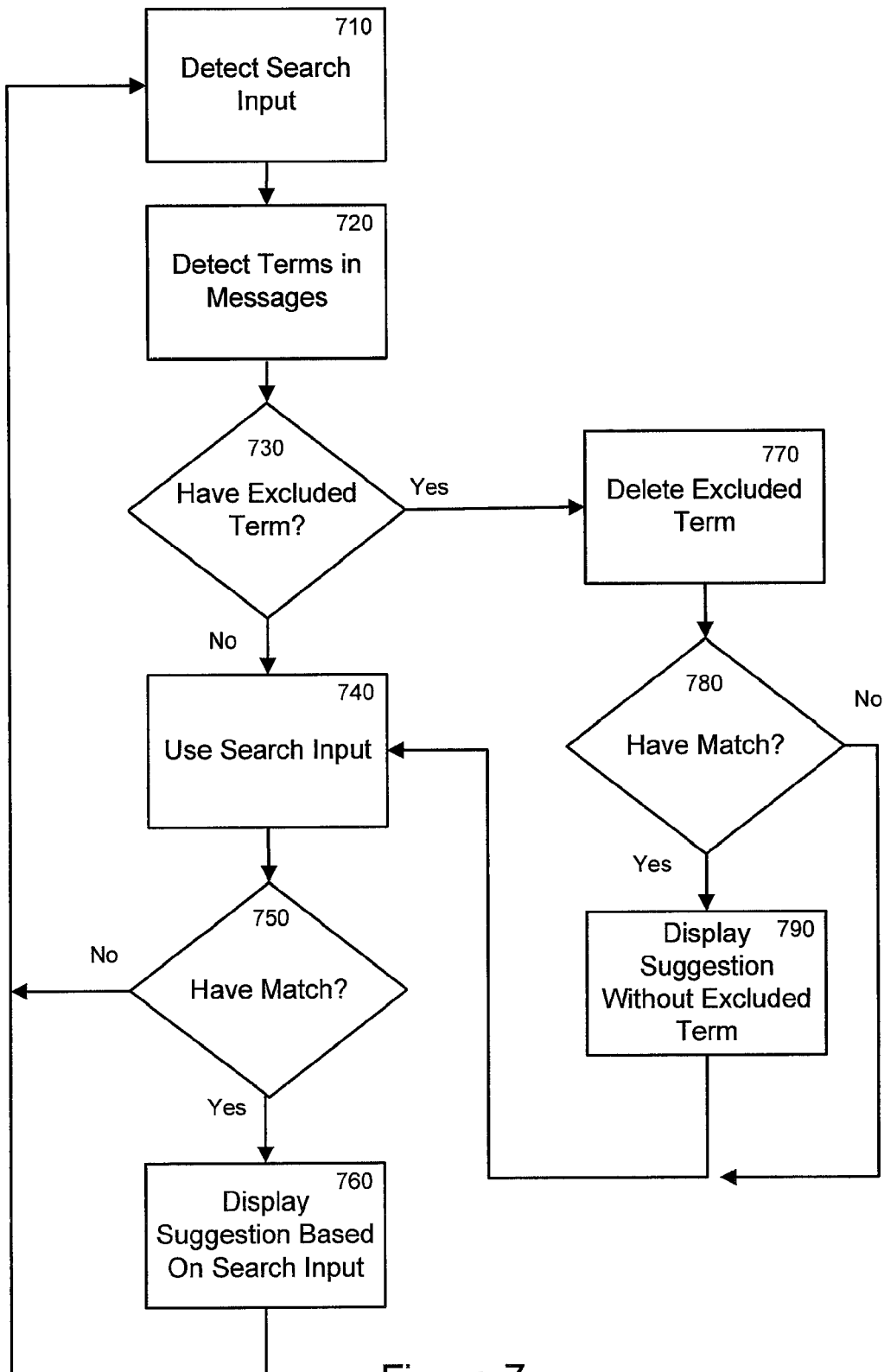
FIG. 7 is a flow diagram consistent with one embodiment of the methods and apparatuses for dynamically searching for electronic mail messages.

The flow diagrams as depicted in FIGS. 5, 6, and 7 are one embodiment of the methods and apparatuses for dynamically searching for electronic mail messages. The blocks within the flow diagrams can be performed in a different sequence without departing from the spirit of the methods and apparatuses for dynamically searching for electronic mail messages. Further, blocks can be deleted, added, or combined without departing from the spirit of the methods and apparatuses for dynamically searching for electronic mail messages.

The flow diagram in FIG. 5 illustrates customizing an exemplary record for search terms according to one embodiment of the invention.

In Block 510, a user name is selected. In one embodiment, the user name is associated with an individual user, a device, a group of device, or a specific company.

In Block 520, electronic messages associated with the user name are detected. In one embodiment, the terms within the electronic messages are also detected.

In Block 530, the terms detected within the Block 520 are indexed.

In Block 540, the indexed terms are stored within the profile associated with the user name as specified in the Block 510.

The flow diagram in FIG. 6 illustrates searching for electronic mail messages according to one embodiment of the invention.

In Block 610, a search term is detected. In one embodiment, the completed search term is detected. In another embodiment, a partial search term is detected. For example, the search term is being entered and is not complete when the partial search term is detected. The partial search term may include a single character in one embodiment.

In Block 620, if there are excluded terms within the detected search term, then the detected search term is modified in Block 640.

An excluded search term may include the terms "a", "the", "best", and the like. Exemplary excluded search terms may be stored within the excluded terms field 440 within the record 400.

In the Block 640, the detected search term is modified to remove the excluded term.

In Block 620, if there are no excluded terms that form the detected search term, a match is performed based on the detected search term in Block 630.

In the Block 630, either the detected search term from the Block 610 or the modified search term from the Block 640 are compared against the terms in messages field 420 from the record 420.

In Block 650, if there are sufficient matches, then the search results are displayed based on the match performed within the Block 630.

In the Block 650, if the are not sufficient matches and the search term was not modified (from Block 660), then the search results are displayed based on the match performed within the Block 630.

In one embodiment, the threshold value to determine whether there are sufficient results depends on a user preference as well as the number of terms stored within the record 400.

In the Block 660, if the search terms were modified, then the excluded terms that were removed are added back into the search terms in Block 670.

In Block 690, a match is performed on the modified search term from the Block 670 against the content within the terms in messages field 420.

In another embodiment, a match is performed while including the excluded term and omitting the excluded term within the Block 690. For example, a match is performed for "the restaurant" and "restaurant".

In one embodiment, the results that are displayed within the Block 680 are shown as the search term is being completed. For instance, in one example, as the search term "the restaurant" is entered beginning with the characters "t", "h", "e", <space>, "r", "e", and "s", the term "the" is excluded. In this example, the modified search term from the Block 640 is "res". If there are sufficient results, then the results are displayed within the Block 680 without the excluded term "the". However, if there are not sufficient results, then the excluded term "the" is added back into the search term within the Block 670 and a match with the leading term "the" is utilized for the match within the Block 690.

In one embodiment, removing the excluded term helps to focus the search on the leading term among multiple terms of the search. In the instance referenced above, the search for a matching term is focused on the term "restaurant" instead of the excluded term "the". In one embodiment, adding the excluded term back into the search terms covers the scenario when the excluded term holds special meaning. In the instance referenced above, if the term "the restaurant" refers to a specific restaurant within one of the electronic mail messages, then adding the excluded term "the" back into the search term allows inclusion of another term to be utilized.

The flow diagram in FIG. 7 illustrates displaying suggestions for search terms according to one embodiment of the invention.

In Block 710, a search term is detected. In one embodiment, a partial search term is detected. For example, the search term is being entered and is not complete when the partial search term is detected. The partial search term may include a single character in one embodiment.

In Block 720, the terms within the electronic mail messages are detected. In one embodiment, these terms are stored within the terms in messages field 420 in the record 400.

In Block 730, if there is an excluded term within the detected search input, then the excluded term is deleted in Block 770.

An excluded search term may include the terms "a", "the", "best", and the like. Exemplary excluded search terms may be stored within the excluded terms field 440 within the record 400.

If there is no excluded term within the original detected search input from the Block 710, then the original search input is utilized within a Block 740.

In Block 750, the detected search input is matched against the terms detected within the messages in the Block 720. For example, if the detected search input is currently "re" then the terms "read" and "restaurant" detected from the Block 720 would apply. However, if the detected search input progresses to "rea", then only the term "read" would apply.

If there is a match between the detected search input and the detected terms within the messages in the Block 750, then a suggestion of the potential matches would be displayed in Block 760. In one embodiment, the suggestion would be displayed within a drop down list. There may be one or more suggestions.

If there is no match within the Block 750, then detection for additional search input continues within the Block 710.

In Block 780, the detected search input without the excluded term is matched against the terms detected within the messages in the Block 720. For example, if the detected search input is currently "the re" then the detected search input without the excluded term is "re". The term "re" is matched with the terms "read" and "restaurant" from the Block 720.

If there is a match between the detected search input without the excluded terms and the detected terms within the messages in the Block 780, then a suggestion of the potential matches would be displayed in Block 790. In one embodiment, the suggestion would be displayed within a drop down list. There may be one or more suggestions.

If there is no match within the Block 780, then the detected search input with the excluded terms are utilized within the Block 740.

In one embodiment, after the display of suggested terms are shown in the Blocks 760 and 790, if the suggested terms are not selected, then additional steps are taken. In the Block 760, additional search input is detected in the Block 710 if the suggested terms are not selected. In the Block 790, the detected search input is utilized in the Block 740 if the suggested terms are not selected.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   storing a profile in a record, the profile defining an identity of an entity, the record including at least one excluded term established in the profile that is selectively excluded from search input;
   detecting original search input entered by a user on an electronic device;
   storing a plurality of terms in the record, the stored terms collected from a plurality of messages associated with the entity;
   modifying the original search input to exclude the excluded term stored in the record from the search input to form a modified search input;
   comparing the modified search input against the stored terms in the record to form a first result that includes a number of the stored terms that match the modified search input;
   comparing the number of the matched terms in the first result to a threshold value;
   in response to a positive determination by the comparison that the number of the matched terms in the first result satisfies the threshold value, displaying the matched terms of the first result to the user; and
   in response to a positive determination by the comparison that the number of the matched terms in the first result fails to satisfy the threshold value:
      matching the original search input against the plurality of stored terms in the record to form a second result that includes another number of the stored terms that match the original search input; and
      displaying the matched terms of the second result to the user.

2. The method of claim 1, wherein the displaying the matched terms of the second result to the user further comprises:
   displaying both the matched terms of the second result and the matched terms of the first result to the user.

3. The method of claim 1, wherein the original search input includes a partial search term where less than all the characters of a term are present, and the displaying the matched terms of the first result to the user and the displaying the matched terms of the second result to the user provide suggestions of search terms to the user to replace the partial search term.

4. The method of claim 3, further comprising:
   soliciting a selection from the user of one of the displayed matched terms.

5. The method of claim 1, further comprising:
   selecting the threshold value based on a number of the matched terms originating from the plurality of messages.

6. The method of claim 1, further comprising:
   selecting the threshold value based on a user preference.

7. The method of claim 1, further comprising:
   detecting the plurality of messages associated with the entity;
   detecting terms with the plurality of messages; and
   storing the detected terms as the plurality of stored terms in the record.

8. The method of claim 7, further comprising:
   indexing the detected terms prior to storing the detected terms as the stored terms.

9. The method of claim 7, wherein the messages are associated with the user as the entity.

10. The method of claim 7, wherein the messages are associated with a group as the entity.

11. The method of claim 1, wherein the messages are electronic mail messages associated with the profile.

12. The method of claim 1, wherein the plurality of messages are electronic mail messages associated with the user as the entity and the stored terms originate from information within a sender field, a recipient filed, a carbon copy filed, a subject line, a date sent filed, a date received filed, or a body area of the electronic mail messages associated with the user.

13. An apparatus comprising:
   a processor operable to execute program instructions; and
   a memory to store a profile in a record, the profile defining an identity of an entity, the record including at least one excluded term established in the profile that is selectively excluded from search input, the memory further having stored therein the program instructions that when executed by the processor implement:
   a search term detection module configured to detect original search input entered by a user;
   a message detection module configured to store a plurality of terms collected from a plurality of messages associated with the entity; and
   a search term processor module configured to:
      modify the original search input to exclude the excluded term stored in the record from the search input to form a modified search input;
      compare the modified search input against the stored terms in the record to form a first result that includes a number of the stored terms that match the modified search input;
      compare the number of the matched terms in the first result to a threshold value;
      display the matched terms in the first result upon a positive determination by the comparison that the number of the matched terms in the first result satisfies the threshold value; and match the original search input against the plurality of stored terms in the record, upon a positive determination by the comparison that if the number of the matched terms in the first result fails to satisfy the threshold value, form a second result that includes another number of the stored terms in the record and cause display of the matched terms of the second result to the user.

14. The apparatus of claim 13, wherein the display of the matched terms of the second result to the user comprises display of both the matched terms of the second result and the matched terms of the first result to the user.

15. The apparatus of claim 13, wherein the match of the original search input occurs on a partial search term where less than all the characters of a term are input, and the display of the matched terms of the first result to the user and the display of the matched terms of the second result to the user provide suggest search terms to replace the partial search term.

16. The apparatus of claim 13, wherein the threshold value is selected based on a number of the stored terms in the record.

17. The apparatus of claim 13, wherein the messages are associated with a group as the entity.

18. The apparatus of claim 13, wherein the messages are electronic mail messages associated with the entity.

19. The apparatus of claim 13, wherein the messages are electronic mail messages associated with the user as the entity and the stored terms in the record originate from information within a sender field, a recipient filed, a carbon copy filed, a subject line, a date sent filed, a date received filed, or a body area of the of the electronic mail messages associated with the user as the entity.

20. An apparatus comprising:
a processor to control electric current and in so doing, causes:
storage of a profile in a record, the profile defining an identity of an entity, the record including at least one excluded term established in the profile that is selectively excluded from search input;
detection of original search input entered by a user on an electronic device;
storage of a plurality of terms in the record, the stored terms collected from a plurality of messages associated with the entity;
modification of the original search input to exclude the excluded term stored in the record from the search input to form a modified search input;
comparison of the modified search input against the stored terms in the record to form a first result that includes a number of the stored terms that match the modified search input;
comparison of the number of the matched terms in the first result to a threshold value;
display of the matched terms of the first result to the user responsive to the positive determination that the number of the matched terms in the first result satisfies the threshold value; and
matching of the original search input against the stored terms in the record to form a second result that includes another number of the stored terms that match the original search input and display of the matched terms of the second result to the user responsive to a positive determination that the number of the matched terms in the first result fails to satisfy the threshold value.

* * * * *